US006058991A

United States Patent [19]

Hill

[11] Patent Number: 6,058,991

[45] Date of Patent: May 9, 2000

[54] METHOD FOR MAKING A WOOD PRODUCT

[76] Inventor: David A. Hill, 2613 N.W. Robert Way, Bend, Oreg.

[21] Appl. No.: 09/274,156

[22] Filed: Mar. 22, 1999

[51] Int. Cl.[7] .......... B23Q 15/00

[52] U.S. Cl. .......... 144/350; 144/346; 144/347; 144/355; 144/351

[58] Field of Search .......... 144/329, 344, 144/345, 346, 347, 350, 355, 351; 428/106

[56] References Cited

U.S. PATENT DOCUMENTS

| | | | |
|---|---|---|---|
| 1,840,974 | 1/1932 | Rockwell | 144/350 |
| 1,843,369 | 2/1932 | Olsen | 144/347 |
| 2,942,635 | 6/1960 | Horne . | |
| 3,878,017 | 4/1975 | Etzold | 144/348 |
| 4,485,860 | 12/1984 | Avilla | 144/350 |
| 4,624,295 | 11/1986 | Howland | 144/350 |
| 5,109,898 | 5/1992 | Schacht | 144/350 |
| 5,505,653 | 4/1996 | Nedo et al. . | |

*Primary Examiner*—W. Donald Bray
*Attorney, Agent, or Firm*—Kolisch, Hartwell, Dickinson, McCormack & Heuser

[57] ABSTRACT

A method of making two wood products using a single attaching or laminating step. A cut is made only partially through a first piece of wood. A second piece of wood is laminated or otherwise attached to the first piece of wood to make a composite piece of wood. The composite piece of wood is then cut to create the two wood products. The method may be used to create two wood products having substantially identical cross-sections.

17 Claims, 2 Drawing Sheets

METHOD FOR MAKING A WOOD PRODUCT

FIELD OF THE INVENTION

The present invention relates to wood processing methods, and more particularly, to a method for making two wood products using a single laminating step.

BACKGROUND OF THE INVENTION

Wood products having a specific cross-sectional geometry are widely used in home and cabinet construction as decorative moldings, stiles and rails, window jambs, and for other purposes. One method for creating such a wood product includes cutting away portions of a piece of wood to arrive at a desired shape. However, the portions of wood that are cut away often cannot be used for any other purpose and can only be discarded. In addition, this method requires a worker to begin with a piece of wood having a large cross-section. It may be difficult and expensive to find pieces of some hardwoods having a large enough cross-section to create the product.

Another method of creating such a wood product includes cutting pieces of wood into desired shapes, and then laminating or gluing the pieces together in a laminating press to create a composite piece of wood having a desired shape. For example, one may saw a corner from one piece of wood and then glue it to another piece of wood. One drawback of this method is that it is complicated to glue and press together pieces of wood having different thicknesses and cross-sections. Presses often allow for multiple products to be placed or nested together in the press so that all the products may be pressed together during single operation of the press, and it is often difficult to nest together pieces that have non-rectangular cross-sections or varying thicknesses. Typically, a press must be fitted with a custom hold-down to press such pieces together. An assembly process that depends on the production of such composite pieces of wood is therefore limited in its output by the required pressing. Furthermore, some desired composite shapes may require creating waste wood as the smaller pieces of wood are shaped prior to lamination.

SUMMARY OF THE INVENTION

The present invention provides an alternative to the methods discussed above. The invention provides a method of making two wood products using only a single or at least a reduced number of attaching or laminating steps. The method may include the following steps: making a cut or recess only partially through a first piece of wood; attaching a second piece of wood to the first piece of wood to make a composite piece of wood; and cutting the composite piece of wood to create two wood products. The attaching step may be performed by a laminating process wherein the two pieces of wood are glued and pressed together. The method of the present invention may be used to create two wood products having substantially identical cross-sections. The invention can be an improvement over the known methods described above because more parts may be processed in a press at a time without requiring any custom hold downs or a custom configuration for the press.

DETAILED DESCRIPTION AND BEST MODE FOR CARRYING OUT THE INVENTION

The method of the present invention permits the creation of two wood products with a single attaching or laminating step. The method includes the steps of: making a cut, such as a kerf or recess, in a first piece of wood; attaching a second piece of wood to the first piece of wood to create a composite piece of wood; and cutting the composite piece of wood to create two wood products. The attaching step may be performed by a laminating press, which glues and presses together the first and second pieces of wood. If desired, additional cutting steps may also be performed to create a desired shape of the wood products. The method of the present invention may be used to create wood products having substantially identical cross-sections.

Figure 1:
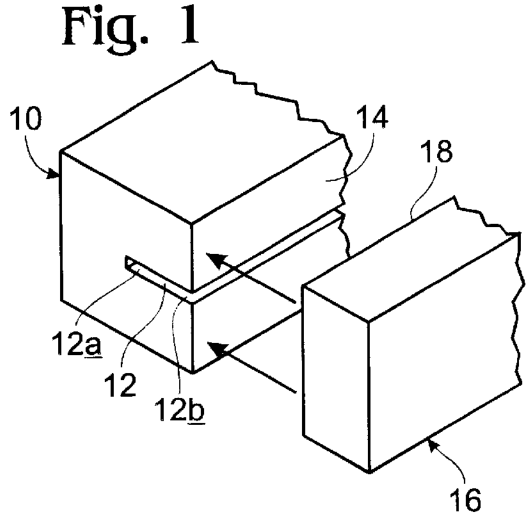
FIG. 1 is a perspective view of the ends of two pieces of wood used in an embodiment of the invention.
Figure 2:
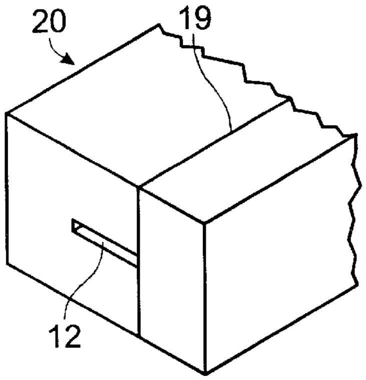
FIG. 2 is a perspective view of an end of a composite piece of wood according to the embodiment shown in FIG. 1.
Figure 3:
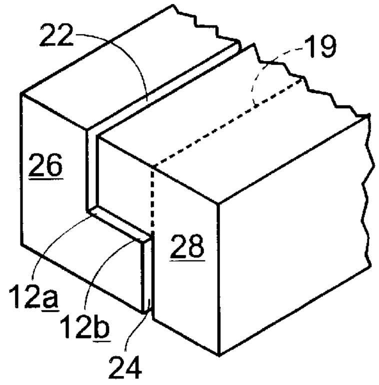
FIG. 3 is a perspective view of the ends of two wood products made according to the embodiment shown in FIG. 1.

FIGS. 1–6 show two examples of how the method of the present invention may be performed. The first example, as depicted in FIGS. 1–3, show the ends of a first and a second piece of wood 10, 16. First and second pieces of wood 10, 16 may have any desired dimension. A cut or kerf 12 is sawn or otherwise made in a face 14 of first piece of wood 10. As depicted in the Figures, kerf 12 is made only partially through the first piece of wood. Kerf 12 has a first end **12*a* and a second end 12*b*. Second piece of wood 16 is glued and pressed to the first piece of wood at 19 to create a composite piece of wood 20. The attachment is preferably made so that a face 18 of the second piece of wood 16 contacts face 14 of first piece of wood 10, as shown in FIG. 2**.

Composite piece of wood 20 is cut at 22 and 24. Cuts 22, 24 may be substantially parallel to each other. Cut 22 is deep enough to connect to first end **12*a* of kerf 12, and cut 24 is deep enough to connect to second end 12*b* of kerf 12. Composite piece of wood 20 is thereby divided to create first and second laminated wood products 26, 28 having complementary cross-sections, as shown in FIG. 3. If one of first or second laminated wood products 26, 28 is turned upside-down from the orientation shown in FIG. 3**, it will be apparent that the first and second laminated wood products have substantially identical cross-sections.

Figure 4:
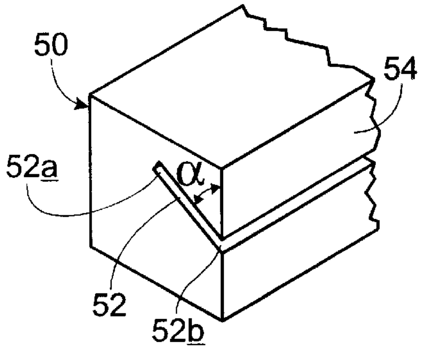
FIG. 4 is a perspective view of an end of a piece of wood used in another embodiment of the invention.
Figure 5:
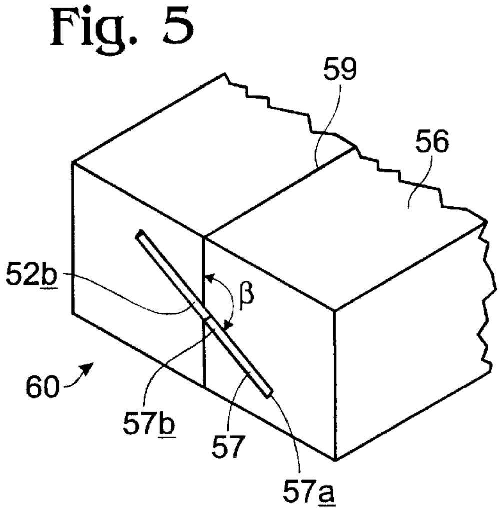
FIG. 5 is a perspective view of an end of a composite piece of wood according to the embodiment shown in FIG. 4.
Figure 6:
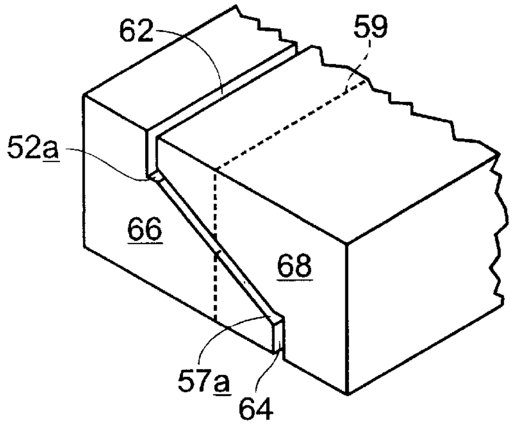
FIG. 6 is a perspective view of the ends of two wood products made according to the embodiment shown in FIG. 4.

FIGS. 4–6 show another example of the method of the present invention which uses first and second pieces of wood 50, 56. A kerf or cut 52 is sawn or otherwise made at a first non-right angle $\alpha$ with respect to a face 54 of first piece of wood 50. Kerf 52 has a first end **52*a* and a second end 52*b*. A kerf or cut 57 is made in second piece of wood 56 at a second non-right angle $\beta$ with respect to a face (not shown, but similar to face 54) of the second piece of wood. Kerf 57 has a first end 57*a* and a second end 57*b*. First and second pieces of wood 50, 56 are laminated, glued, or otherwise attached at 59 to form a composite piece of wood 60. As shown in FIG. 5, first and second pieces 50, 56 may be attached so that second end 52***b* of cut 52 is aligned with second end 57*b* of cut 57 to form a continuous kerf or cut within composite piece of wood 60.

Composite piece of wood 60 is cut at 62 and 64. Cut 62 is deep enough to connect to first end 52*a* of kerf 52, and cut 64 is deep enough to connect to first end 57*a* of kerf 57. Composite piece of wood 60 is thereby divided to create first and second laminated wood products 66, 68 having substantially complementary cross-sections, as shown in FIG. 6. If one of first or second laminated wood products 66, 68 is turned upside-down from the orientation shown in FIG. 6, it will be apparent that the first and second laminated wood products have substantially identical cross-sections.

Figure 7:
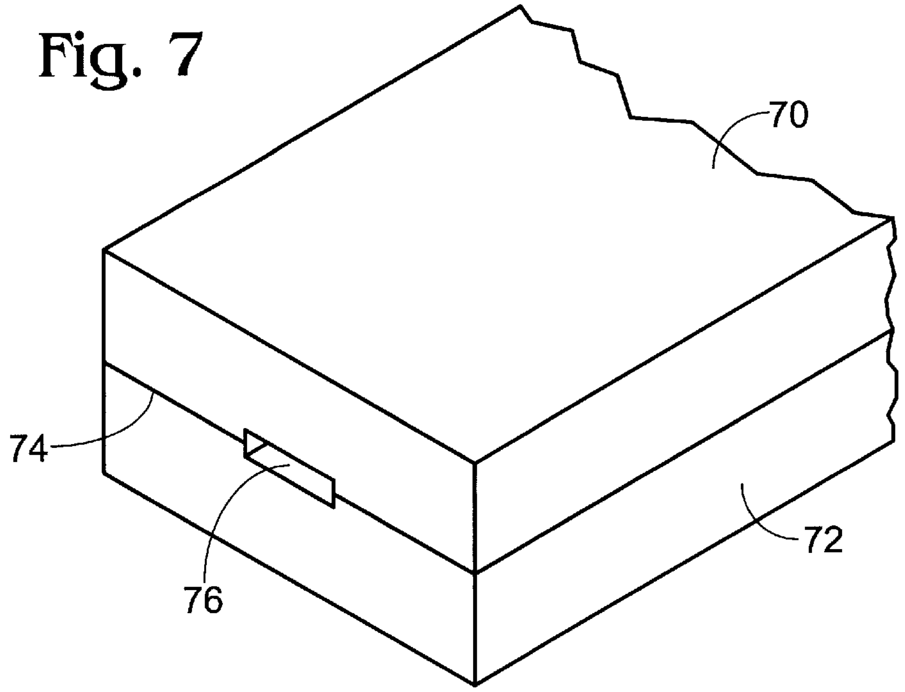
FIG. 7 is a perspective view of an end of a composite piece of wood used in another embodiment of the invention.
Figure 8:
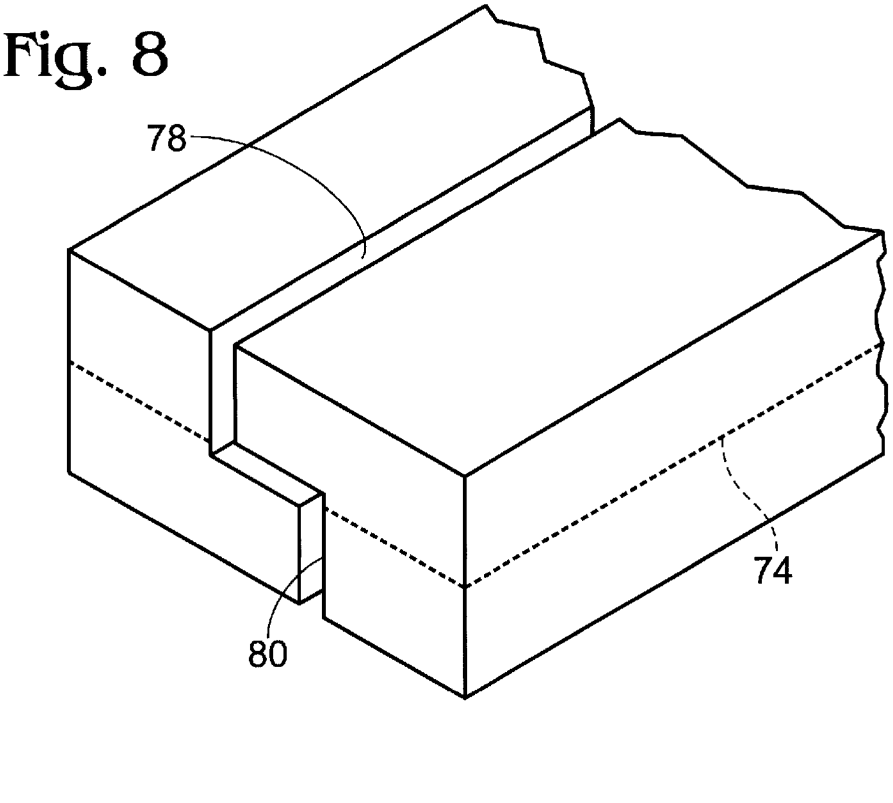
FIG. 8 is a perspective view of the ends of two wood products made according to the embodiment shown in FIG. 7.

FIGS. 7 and 8 show a first piece of wood 70 joined to a second piece of wood 72. Pieces 70 and 72 are pressed and glued together at 74. The surfaces of pieces 70 and 72, that are glued together at 74 are each provided with a recess, and those recesses together define pocket 76. The recess in each of pieces 70 and 72 is created by molding or some other known process prior to gluing the two pieces together. When the two pieces are glued together, the recesses align with each other to create pocket 76. The term "cut" is intended to include creating recesses such as those in parts 70 and 72, through molding or some other process. The resulting composite piece of wood is then cut at 78 and 80, as shown in FIG. 8, to create two wood products, as shown.

The method of the present invention is not limited to the examples shown in the Figures, but may be modified in many ways. For example, the pieces of wood may have similar or different shapes and may be cut at varying depths and angles. The cuts may be straight or curved as desired. Multiple cuts or kerfs may be created in the first, second, or composite pieces of wood. The two wood products may have identical or dissimilar shapes and cross-sections. These and other modifications are within the scope of the present invention.

One advantage of the present invention is that several wood products may be placed in a press, typically side-by-side, and the several wood products may then be pressed together with a single operation of the press. Custom hold downs or custom modifications to the press are typically not required. The time required to make wood products is therefore reduced, and the throughput of an assembly process using the invented method is increased because multiple final products are made from each wood product placed in the press.

A related advantage is reduction in cost. Because an attaching apparatus such as a laminating press need only be used once to create two wood products, wear and tear on the laminating press is reduced, and maintenance costs are correspondingly reduced. Furthermore, little, if any, waste wood is created by the method of the present invention. Wood that would normally be cut away from a piece of wood and discarded becomes part of another wood product further reducing costs.

INDUSTRIAL APPLICABILITY

The invention is applicable in the wood products industry. While the invention has been disclosed in its preferred form, the specific embodiments thereof as disclosed and illustrated herein are not to be considered in a limiting sense as numerous variations are possible. Applicant regards the subject matter of the invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims are also regarded as included within the subject matter of applicant's invention irrespective of whether they are broader, narrower, or equal in scope to the original claims.

I claim:

1. A method of making two wood products, the method comprising:

making a first cut in a first piece of wood, the first cut being made only partially through the first piece of wood;

attaching a second piece of wood to the first piece of wood to make a composite piece of wood; and cutting the composite piece of wood to create the two wood products, wherein the cutting connects to the first cut so that the composite piece of wood separates along the first cut.

2. The method of claim 1, wherein the first cut is made in a face of the first piece of wood, and wherein the making step includes cutting the first piece of wood perpendicular to the face of the first piece of wood.

3. The method of claim 1, wherein the first cut is made in a face of the first piece of wood, wherein the making step includes cutting the first piece of wood at a non-perpendicular angle with respect to the face of the first piece of wood.

4. The method of claim 1, wherein prior to the attaching step a second cut is created in a face of the second piece of wood.

5. The method of claim 4, wherein the second cut is made only partially through the second piece of wood.

6. The method of claim 4, wherein the first cut is made in a face of the first piece of wood, and wherein the attaching step is performed while holding the face of the first piece of wood adjacent the face of the second piece of wood.

7. The method of claim 4, wherein the first cut is made in a face of the first piece of wood, and wherein the attaching step includes attaching the face of the first piece of wood to the face of the second piece of wood.

8. The method of claim 1, wherein the attaching step includes laminating the second piece of wood to the first piece of wood.

9. The method of claim 1, wherein the attaching step includes gluing and pressing together the first and second pieces of wood.

10. The method of claim 1, wherein the cutting step includes making substantially parallel cuts in the composite piece of wood.

11. The method of claim 1, wherein the cutting step includes making second and third cuts that are substantially parallel to the face of the first piece of wood.

12. The method of claim 1, wherein the cutting step includes making second and third cuts that connect to the first cut.

13. The method of claim 1, wherein the cutting step includes making additional cuts so that the two wood products have substantially identical shapes.

14. A method of making two wood products, the method comprising:

making a first cut in a first piece of wood, the first cut being made only partially through the first piece of wood and the first cut having first and second ends;

attaching a second piece of wood to the first piece of wood over the first cut to make a composite piece of wood wherein the first cut is interior the composite piece of wood; and making a second cut in the composite piece of wood that joins to the first end of the first cut, and making a third cut in the composite piece of wood that joins to the second end of the first cut.

15. A method of making two wood products, the method comprising:

a step for making a first cut in a first piece of wood, the first cut being made only partially through the first piece of wood;

a step for attaching a second piece of wood to the first piece of wood to make a composite piece of wood; and a step for cutting the composite piece of wood to create the two wood products.

16. A method of making two wood products, the method comprising:

making a first cut in a face of a first piece of wood at a non-perpendicular angle with respect to the face, the first cut being made only partially through the first piece of wood;

attaching a second piece of wood to the first piece of wood to make a composite piece of wood; and cutting the composite piece of wood to create the two wood products.

17. A method of making two wood products, comprising:

providing a first piece of wood having a length;

making a first cut in the first piece of wood along the length of the first piece of wood, wherein the first cut is made only partially through the first piece of wood;

attaching a second piece of wood to the first piece of wood to make a composite piece of wood, the composite piece of wood also having a length; and cutting the composite piece of wood along the length of the composite piece of wood to create the two wood products, wherein the cutting connects to the first cut so that the composite piece of wood separates along the first cut.

* * * * *